Patented Jan. 21, 1936

2,028,303

UNITED STATES PATENT OFFICE 2,028,303

PRODUCTION OF ORGANIC DISULPHIDES

Luther B. Turner, Elizabeth, N. J., assignor to Standard Oil Development Company, a corporation of Delaware No Drawing. Application October 29, 1932, Serial No. 640,347

13 Claims. (Cl. 260—16)

This invention relates to the production of organic disulphides from mercaptans and more particularly to the production of disulphides from mercaptans obtained from petroleum oils.

It has been found that organic disulphides may be obtained in high yields by direct vapor phase oxidation of mercaptans according to the following reaction:

$$2RSH + 1/2O_2 = R_2S_2 + H_2O$$

This invention is illustrated by the following example:

A fraction of mercaptans corresponding to ethyl mercaptan and boiling from 30 to 40° C. is obtained by fractional distillation of the distillate secured by steam distilling a spent aqueous caustic solution used in treating sour petroleum naphthas. This mercaptan fraction is vaporized, mixed with air and passed over 100 cc. of activated charcoal maintained at a temperature of 225° C. The products leaving the catalytic zone are cooled with ice water and then with a mixture of solid carbon dioxide and isopropyl alcohol. The condensate recovered consists largely of ethyl disulphide. Using a mercaptan feed rate of 0.71 cc. (liquid volume) per minute and an air rate of 395 cc. per minute, there is obtained a 94.2% conversion of mercaptans to ethyl disulphide.

The activated charcoal used in the above example may be prepared by heating commercial activated charcoal to 300° C. under vacuum. The reaction may be conducted with the catalyst in an iron tube. Glass or porcelain reactors may be used but it has been observed that iron has no deleterious effect on the reaction and its use is accordingly preferred. The above conditions represent the optimum observed with this particular catalyst. While relatively high yields representing above about 50% conversion may be obtained under widely varying conditions, best results are obtained when the reaction with this catalyst is conducted between the limits of about 100 and 300° C. and preferably between 175 and 250° C. At higher temperatures some loss due to the formation of sulphur dioxide occurs. It is generally preferred to operate under such conditions that not more than a few per cent of sulphur dioxide is formed. The ratio of air to mercaptans is preferably about the theoretical required for the reaction. Ratios of about 50% to 300% of the theoretical amount of oxygen (air) required for the reaction will be found satisfactory and ratios varying between even wider limits may be used. Substantially pure oxygen or other oxidizing gas mixtures besides air containing free or combined oxygen, for example gases containing nitrogen oxides, sulphur dioxide or hydrogen peroxide, may be used. The reaction may also be conducted with other catalysts. For example, using a catalyst consisting of a steel wool coated with iron oxide, a high yield of disulphides may be obtained from a mixture of mercaptan vapor and air at temperatures as low as 100° C. or even lower. Copper oxide and other metallic oxides and oxidation catalysts generally are suitable for this reaction. The reaction may even be conducted in the absence of catalysts at suitably elevated temperatures but in such operation it is preferred that less than the theoretical amount of oxygen be used in order to avoid excessive oxidation.

Mercaptans of higher boiling point may be converted to the corresponding disulphides by the above process. For example, a fraction of mercaptans boiling from 50 to 62° F. obtained as described in the above example and corresponding to propyl and isopropyl mercaptans may be converted to the corresponding disulphides in good yield by this process.

This process is applicable to the preparation of disulphides from substantially all mercaptans which may be vaporized without decomposition and is particularly applicable to the production of the corresponding disulphides from alkyl mercaptans containing not more than five carbon atoms. The mixture of mercaptans obtained by the steam distillation of spent aqueous caustic used in treating sour cracked naphthas represents a readily available source of mercaptans particularly suitable for this process. This mixture is composed principally of methyl, ethyl, propyl and butyl mercaptans and isomers thereof and may be used as obtained or after fractionation into any desired fractions. Highest yields are generally obtained from fractions corresponding to the methyl and ethyl mercaptans.

The catalyst used for disulphide production may undergo a slight loss in activity with time and may be reactivated by a periodic treatment with air, steam or other oxidizing gases at the operating temperature or at somewhat higher temperatures.

The disulphides obtained by the above methods are suitable as secured for gas odorants and alcohol denaturants. They may further be purified by suitable methods such as washing with aqueous caustic soda and may be separated by distillation into fractions of desired volatility.

They may be used as solvents for rubber, pyroxylin compositions, resins and the like.

The reaction for the production of organic disulphides may also be conducted at pressures above or below atmospheric, in the presence of steam, with recirculation of gaseous products and of unconverted mercaptans and with other modifications of a similar nature without departing from the scope of my invention.

This invention is not to be limited to any illustrative examples which are given only in illustration nor to any theories regarding the reactions involved, but only to the following claims in which I wish to claim all novelty insofar as the prior art permits.

I claim:

1. The process which comprises subjecting mercaptans (vaporizable without decomposition) to limited oxidation sufficient to form disulphides in the vapor phase and withdrawing a reaction product containing corresponding disulphides.

2. Process for preparing an organic disulphide, comprising reacting upon a mercaptan (vaporizable without decomposition) in the vapor phase with an oxidizing agent comprising oxygen either free or combined under conditions permitting mild oxidation.

3. Process for preparing an organic disulphide, comprising reacting upon a mercaptan (vaporizable without decomposition) in the vapor phase in the presence of an oxidation catalyst with an oxidizing agent comprising oxygen either free or combined under conditions permitting mild oxidation.

4. Process for preparing an organic disulphide, comprising passing a gaseous mixture containing a vaporizable alkyl mercaptan and an oxidizing gas over a solid oxidation catalyst under conditions permitting mild oxidation.

5. Process for preparing an organic disulphide, comprising passing a gaseous mixture containing mercaptan vapor and free oxygen over a mild oxidation catalyst at a reaction temperature insufficient to permit the formation of substantial amounts of sulfur dioxide.

6. Process for preparing an organic disulphide comprising passing mercaptan vapor and an oxygen-containing gas over a mild oxidation catalyst at a temperature of about 100 to about 250° C.

7. Process according to claim 6 in which the oxygen-containing gas is air.

8. Process according to claim 6 in which the mercaptan comprises an alkyl mercaptan of not more than 5 carbon atoms.

9. Process according to claim 6 in which the mercaptan comprises ethyl mercaptan.

10. Process according to claim 6 in which the mercaptan comprises a mixture of mercaptans corresponding to the mercaptans removed from sour petroleum naphthas with aqueous alkali.

11. Process according to claim 6, in which the catalyst comprises active charcoal.

12. Process according to claim 6 in which the catalyst comprises a metal oxide.

13. The process which comprises subjecting vaporizable alkyl mercaptans to limited oxidation sufficient to form disulphides in the vapor phase and withdrawing a reaction product containing corresponding disulphides.

LUTHER B. TURNER.